United States Patent [19]

Hartschen et al.

[11] Patent Number: 4,900,773

[45] Date of Patent: Feb. 13, 1990

[54] JOINT FILLER

[75] Inventors: Hans-Peter Hartschen, Krefeld; Helmut Loth, Essen, both of Fed. Rep. of Germany

[73] Assignee: Henkel Kommanditgesellschaft auf Aktien, Dusseldorf-Holthausen, Fed. Rep. of Germany

[21] Appl. No.: 659,652

[22] Filed: Oct. 11, 1984

Related U.S. Application Data

[63] Continuation of Ser. No. 437,873, Oct. 29, 1982, abandoned.

[30] Foreign Application Priority Data

Jan. 4, 1982 [AT] Austria ................................. 3/1982

[51] Int. Cl.$^4$ ................................................ C08J 5/03
[52] U.S. Cl. .................................... 524/473; 524/547; 526/279
[58] Field of Search ................. 524/473, 547; 526/279

[56] References Cited

U.S. PATENT DOCUMENTS 4,333,867 6/1982 Sauntson .............................. 524/547
4,397,981 8/1983 Doi et al. ............................. 524/472

*Primary Examiner*—Schofer Joseph L.
*Assistant Examiner*—Alex H. Walker
*Attorney, Agent, or Firm*—Ernest G. Szoke; Wayne C. Jaeschke; William H. Dippert

[57] ABSTRACT

This invention relates to a joint filler. More particularly, this invention relates to a composition useful as a joint filler which comprises (a) an aqueous dispersion of a polymerization product containing silicol groups of (i) two or more monomers selected from the group consisting of vinyl esters, acrylates, butadiene, styrene, and acrylonitrile, (ii) lower alkoxyvinyl silanes, and (iii), optionally, additional copolymerizable monomers, and (b) from about 20 to 120 percent by weight, based upon the weight of the solid polymerization product, of chloroparaffins having a chlorine content of from about 40 to 70 percent by weight, based upon the weight of the chloroparaffins.

14 Claims, No Drawings

JOINT FILLER

This application is a continuation of U.S. patent application Ser. No. 437,873, filed Oct. 29, 1982, now abandoned.

FIELD OF THE INVENTION

This invention relates to a joint filler. More particularly, this invention relates to a joint filler based upon aqueous dispersions of polymerization products of vinyl esters, acrylates, butadiene, styrene, acrylonitrile, and, optionally, other copolymerizable monomers.

BACKGROUND OF THE INVENTION

Joint fillers based upon dispersions of polyacrylates, polyisoprenes, polybutadiene/styrene, or polybutadiene/acrylonitrile, which also contain considerable quantities of inorganic fillers, have been known for some time. The use of aqueous dispersions of polymerization products of vinyl esters, acrylates, and similar substances, which contain silicol groups added by polymerization, for the preparation of lamination construction materials as well as adhesives, is also known. The introduction of the silicol groups into the polymerization products results in an improved adhesion to various different surfaces, for example, concrete, stucco, cement, asbestos, glass, metals, and other rigid surfaces.

It is desirable that joint fillers exhibit good adhesion to various materials. In addition, they should also have good internal strength, which is expressed by improved values of ductile yield and tensile strength.

OBJECTS OF THE INVENTION

It is an object of the invention to provide novel joint fillers.

It is also an object of the invention to provide joint fillers based upon aqueous dispersions of polymerization products of vinyl esters, acrylates, butadiene, styrene, acrylonitrile, and, optionally, other copolymerizable monomers.

It is a further object of the invention to provide joint fillers that adhere well to absorbent as well as non-absorbent substrates without previous application of primer and that are able to withstand without fracture the stresses to which joint fillers are normally subjected.

It is a yet further object of the invention to provide joint fillers comprising (a) aqueous dispersions of polymerization products containing silicol groups of (i) two or more monomers selected from the group consisting of vinyl esters, acrylates, butadiene, styrene, and acrylonitrile, (ii) lower alkoxyvinyl silanes, and (iii), optionally, additional copolymerizable monomers, and (b) from about 20 to 120 percent by weight, based upon the weight of the solid polymerization product, of chloroparaffins having a chlorine content of from about 40 to 70 percent by weight, based upon the weight of the chloroparaffins.

These and other objects of the invention will become more apparent in the discussion below.

DETAILED DESCRIPTION OF THE INVENTION

Joint fillers that adhere well to absorbent or non-absorbent surfaces without primer application and that can withstand normal forces have now been developed. According to applicants' invention, the joint fillers comprise aqueous dispersions of polymerization products based upon vinyl esters, acrylates, butadiene, styrene, and/or acrylonitrile, lower alkoxyvinyl silanes, and, optionally, additional copolymerizable monomers. The polymerization products, which contain silicol groups, are combined with from about 20 to 120 percent by weight, based upon the weight of solid polymerization products, of chloroparaffins containing from about 40 to 70 percent by weight of chlorine, based upon the weight of the chloroparaffins. In addition to these essential components, the joint fillers according to the invention also contain inorganic fillers and/or pigments, preferably in a total amount of from about 1 to 5 parts by weight to 1 part by weight of the polymerization product having silicol groups.

The polymerization products containing silicol groups, or dispersions thereof, which are useful according to the invention, are known and have been employed for the various purposes, including as adhesives and as a base for construction lamination agents. Such dispersions have good wet adhesion and good mechanical resistance. They are prepared in wellknown manner by polymerization of the monomers mentioned, for example, vinyl acetate, vinyl propionate, vinyl laurate, vinyl chloride, ethylene, acrylates such as butyl acrylate, butadiene, styrene, acrylonitrile, and similar monomers, in the presence of lower alkoxyvinyl silanes. The lower alkoxyvinyl silane grouping is hydrolyzed to form the corresponding silicols in this case.

The copolymerizates are present in the aqueous dispersions in amounts of from about 30 to 60 percent by weight, preferably from about 40 to 55 percent by weight, based upon the total weight of the aqueous dispersion. The amount of silicol groups in the solid copolymerizate is preferably from about 0.05 to 2 percent by weight.

It was surprising that relatively large amounts of chloroparaffins can be worked into such dispersions with a resulting improvement in adhesion and also a considerable increase in the breaking strength of the joint, in comparison with other dispersions used for this purpose. The chloroparaffins are also known compounds and are used as softeners for various different polymerization products. They are derived from hydrocarbons with from approximately 8 to 28 carbon atoms and can also be branched in the basic structure. They are usually in the form of mixtures of $C_{10}$ to $C_{13}$, $C_{14}$ to $C_{17}$, or $C_{20}$ to $C_{28}$ hydrocarbon chains. They are largely chlorinated and have a chlorine content of from about 40 to 70 percent by weight, preferably of from about 48 to 64 percent by weight, based upon the weight of the chloroparaffins.

The fillers and/or pigments useful according to the invention include all conventional fillers and/or pigments. However, preferably the fillers are selected from the group consisting of calcium carbonate, talc, barium sulfate, light spar, kaolin, ground dolomite, ground slate, and sharp and non-absorbent sand, particularly of fine granulation. Preferred pigments include titanium dioxide, iron oxide, zinc white, and similar substances.

The dispersions according to the invention are prepared by mixing in suitable mixers, optionally with the addition of other adjuvants. Such adjuvants may be surface-active compounds in an amount of from about 0.01 to 0.5 percent by weight, based upon the total weight or the solids content of the polymer and the chloroparaffin.

The addition of other adjuvants, such as water-soluble cellulose ethers, polyvinyl alcohol, polyacrylates, or foam inhibitors, for example, a foam inhibitor based upon silicone fluid, is also possible.

Good adhesion values are obtained with the joint fillers according to the invention when the joint fillers are used with various building and construction materials. Examples of such materials include metals such as lauminum, iron, steel, or zinc; plastics such as polyvinylchlorides; polycarbonates, or polymethacrylates; and mineral building elements of glass, concrete, ceramic, asbestos cement, or enamelled parts.

The following examples are intended to illustrate the invention and should not be construed as limiting the invention thereto.

EXAMPLES

Examples 1 and 2

A polymer dispersion prepared from approximately 50 parts by weight of styrene and 50 parts by weight of butyl acrylate and which contained approximately 1 percent by weight of vinyl silicol groups (available under the name Vinnapas-SAF-54 from Wacker-Chemie, Germany) was used. Also used was a nonionic wetting agent comprising an adduct of a $C_{12}/C_{14}$-glycol with 10 mols of ethylene oxide (available under the name Epicol from Henkel KgaA Germany). The mixtures used to prepare joint fillers had the following formulations:

EXAMPLE 1

| Component | Amount (gm) |
| --- | --- |
| Polymer dispersion (50%) | 30.0 |
| Chloroparaffin ($C_{10}$—$C_{13}$, 49% chlorine) | 16.5 |
| Nonionic wetting agent | 0.5 |
| Heavy spar | 43.0 |
| Talc | 5.0 |
| Titanium dioxide | 5.0 |
| | 100.0 |

EXAMPLE 2

| Component | Amount (gm) |
| --- | --- |
| Polymer dispersion (50%) | 30.0 |
| Chloroparaffin ($C_{10}$—$C_{13}$, 63% chlorine) | 15.0 |
| Nonionic wetting agent | 0.5 |
| Heavy spar | 44.5 |
| Talc | 5.0 |
| Titanium oxide | 5.0 |
| | 100.0 |

In place of the polymer dispersion described above, a polymer dispersion (50% by weight) from 25% vinyl chloride and 25% vinyl laurate and 48,5% vinyl acetate and 1,5% vinyl silicol groups (from triethoxyvinyl silane) and in place of the wetting agent described above an adduct of 12 mols ethylene oxide with one mol stearylalcohol under the name Eumulgin from Henkel KgaA could be used instead.

The mixtures were prepared in a vacuum planetary mixer, and the individual components were added sequentially. After 15 minutes, the mixer was totally evacuated, and the mixing continued to eliminate air pockets.

COMPARISON EXAMPLE

Using the procedure described above, a comparison product was prepared from a mixture comprised as follows:

| Component | Amount (gm) |
| --- | --- |
| 60% by weight polyacrylate dispersion (mixture) of ethyl and isooctyl esters, viscosity of 800 mPa.s as measured at 25° C., according to Epprecht | 35.0 |
| Polyisobutylene (commercial grade) | 7.0 |
| Chalk | 42.0 |
| Talc | 8.0 |
| Titanium dioxide | 6.0 |
| Nonionic wetting agent | 0.5 |
| Dyes | 1.5 |
| | 100.0 |

Testing

Test pieces were prepared from aluminum, glass, and PVC according to DIN 52455. The test pieces were stored for three days at ambient climatic conditions, subjected to a temperature of 70° C. for three days, and then again stored at ambient climatic conditions for one day. The ductile yield and breaking stress values (as determined according to DIN 52455) for aluminum, glass, and PVC obtained with materials prepared according to Examples 1 and 2 and the Comparison Example, are set forth in the following tables:

TABLE 1

| Example | Ductile Yield (%) | | |
| --- | --- | --- | --- |
| | Aluminum | Glass | PVC |
| 1 | 167 | 150 | 191 |
| 2 | 253 | 235 | 211 |
| Comparison | 15 | 20 | — |

TABLE 2

| Example | Breaking Stress (N/cm$^2$) | | |
| --- | --- | --- | --- |
| | Aluminum | Glass | PVC |
| 1 | 8.7 | 7.6 | 8.6 |
| 2 | 18.1 | 17.2 | 17.2 |
| Comparison | 13.0 | 17.3 | — |

The preceding specific embodiments are illustrative of the practice of the invention. It is to be understood, however, that other expedients known to those skilled in the art or disclosed herein, may be employed without departing from the spirit of the invention or the scope of the appended claims.

We claim:

1. A composition useful as a joint filler which comprises (a) an aqueous dispersion of a polymerization product containing silicol groups of (i) two or more monomers selected from the group consisting of vinyl esters, acrylates, butadiene, styrene, and acrylonitrile, (ii) lower alkoxyvinyl silanes, and (iii), optionally, additional copolymerizable monomers, and (b) from about 20 to 120 percent by weight, based upon the weight of the solid polymerization product, of chloroparaffins having a chlorine content of from about 40 to 70 percent by weight, based upon the weight of the chloroparaffins.

2. The composition of claim 1, wherein component (a) comprises from about 30 to 60 percent by weight, based upon the weight of the total aqueous dispersion, of solid polymerization product.

3. The composition of claim 2, wherein component (a) comprises from about 40 to 55 percent by weight, based upon the weight of the total aqueous dispersion, of solid polymerization product.

4. The composition of claim 1, wherein the polymerization product of component (a) contains from about 0.05 to 2 percent by weight, based upon the weight of the polymerization product, of silicol groups.

5. The composition of claim 1 which additionally contains inorganic filler and/or pigment in an amount of from 1 to 5 parts by weight per part by weight of polymerization product containing silicol groups.

6. In a method for filling joints by inserting a joint filler composition between two pieces to be attached to one another, the improvement which comprises using a composition of claim 1 as the joint filling composition.

7. The method of claim 6, wherein the pieces to be attached are each independently comprised of a material selected form the group consisting of polyvinyl chloride, concrete, glass, enamel, aluminum, zinc, ceramic, and mixtures thereof.

8. The method of claim 7, wherein one piece is comprised of polyvinyl chloride and the other is comprised of concrete, glass, and/or enamel.

9. The method of claim 7, wherein one piece is comprised of aluminum and/or zinc and the other is comprised of concrete, glass, and/or enamel.

10. The method of claim 7, wherein one piece is comprised of ceramic and the other piece is comprised of concrete, glass, and/or enamel.

11. A composition useful as a joint filler which comprises
    (a) an aqueous dispersion of a polymerization product containing silicol groups of (i) two or more monomers selected from the groups consisting of vinyl esters, acrylates, butadiene, styrene, and acrylonitrile and (ii) lower alkoxyvinyl silanes, said dispersion comprising from 30 to 60 percent by weight, based upon the weight of the total aqueous dispersion, of solid polymerization product, and
    (b) from about 20 to 120 percent by weight, based upon the weight of the solid polymerization product, of chloroparaffins having a chlorine content of from about 40 to 70 percent by weight, based upon the weight of the chloroparaffins.

12. The composition of claim 11, wherein component (a) is an aqueous dispersion of a polymerization product containing silicol groups of (i) two or more monomers selected from the group consisting of vinyl esters, acrylates, butadiene, styrene, and acrylonitrile, (ii) lower alkoxyvinyl silanes, and (iii) additional copolymerizible monomers.

13. The composition of claim 11, wherein the polymerization product of component (a) contains from about 0.05 to 2 percent by weight, based upon the weight of the polymerization product, of silicol groups.

14. In a method for filling joints by inserting a joint filler composition between two pieces to be attached to one another, the improvement which comprises using a composition of claim 11 as the joint filling composition.

* * * * *